USO05662826A

United States Patent [19]
Nilsson et al.

[11] Patent Number: 5,662,826
[45] Date of Patent: Sep. 2, 1997

[54] PROCESS FOR THE PREPARATION OF A COAGULATING CHEMICAL COMPRISING DISSOLVING A SOLID ZEOLITE IN A SOLUTION OF TRIVALENT METAL SALT

[75] Inventors: Rolf Olof Nilsson, Mölle; Kjell-Erik Stendahl, Helsingborg, both of Sweden

[73] Assignee: Kemira Kemi Aktiebolag, Helsingborg, Sweden

[21] Appl. No.: 370,839

[22] Filed: Jan. 10, 1995

Related U.S. Application Data

[63] Continuation of Ser. No. 986,920, Dec. 8, 1992, abandoned.

[51] Int. Cl.$^6$ ...................................................... C02F 1/52
[52] U.S. Cl. .......................... 252/179; 210/696; 502/414; 502/415; 502/407; 502/60; 423/700; 423/711
[58] Field of Search ............................ 252/179; 210/696; 502/414, 415, 407, 60; 423/700, 711

[56] References Cited

U.S. PATENT DOCUMENTS

| | | | |
|---|---|---|---|
| 2,004,257 | 6/1935 | Tschirner | 210/667 |
| 4,486,314 | 12/1984 | Köppelmann et al. | 210/714 |
| 4,837,396 | 6/1989 | Henbst et al. | 502/67 |
| 4,981,675 | 1/1991 | Haaje et al. | 423/556 |
| 5,071,587 | 12/1991 | Perman | 252/181 |
| 5,194,413 | 3/1993 | Kumar | 502/65 |

FOREIGN PATENT DOCUMENTS

| | | |
|---|---|---|
| 551061 | 7/1993 | European Pat. Off. . |
| 201506 | 12/1982 | Japan . |
| 193133 | 11/1984 | Japan . |
| 38611 | 2/1986 | Japan . |
| 133140 | 6/1986 | Japan . |

OTHER PUBLICATIONS

Donald W. Breck, Zeolite Molecular Sieves, 1974 pp. 502–507.

Combined Coagulating Agent, Murin, Josef et al, CA:116:11000q 15 Jul. 1991 (CS 267, 323) p. 283.

Chemical Treatment for Strength Increase of Granulated Absorbents, Spitzen Pavol et al CA:118:24574W 29 Oct. 1991 p. 138.

Primary Examiner—Jacqueline V. Howard
Attorney, Agent, or Firm—Brumbaugh, Graves, Donohue & Raymond

[57] ABSTRACT

The present invention relates to a process for the preparation of a coagulant for water purification, in particular purification of sewage water, for pulp and paper manufacture, for dewatering organic matter, for concentrating minerals, and containing a metal salt and silicate, whereby a solid zeolite is dissolved in a solution of trivalent metal salt in a molar ratio $Me^{3+}$:Si of >2:1, preferably 2–500:1, as well as a coagulant.

5 Claims, No Drawings

PROCESS FOR THE PREPARATION OF A COAGULATING CHEMICAL COMPRISING DISSOLVING A SOLID ZEOLITE IN A SOLUTION OF TRIVALENT METAL SALT

This application is a continuation of application Ser. No. 07/986,920, filed on Dec. 8, 1992, now abandoned.

TECHNICAL FIELD

The present invention relates to a process for the preparation of a coagulating chemical, such as a water purification chemical, in particular for the purification of drinking and sewage water, for flocculating cellulose fibres for manufacturing paper and pulp, for dewatering organic matter, and for concentrating minerals, and containing a trivalent metal salt and silicate.

The object of the present invention is to obtain a coagulating chemical, such as a water purification chemical having improved flocculation and settling ability at the purification of water, in particular drinking and sewage water.

BACKGROUND OF THE INVENTION

Chemical flocculation using inorganic coagulating chemicals has the advantage of providing a rapid sedimentation of particles and phosphorous containing compounds. The particle reducing effect is of great importance as 60 to 75% of COD of sewage water depends on particles. Sewage water contains organic compounds as well, of which a smaller part can be precipitated using inorganic salts. The use of these salts only can reduce more than 60 to 75% of COD of sewage water.

The use of a coagulating chemical is, however, not only restricted to the purification of sewage water but is also used in the purification of raw water for the production of drinking water. Further, coagulating chemicals are used in the manufacture of pulp in order to flocculate the cellulose fibre as well as in paper production for the flocculation of the cellulose fibre and filling agents present and at the hydrophobation of paper to attach resinous sizing agents onto the cellulose fibres. Further flocculation agents are Used to dewater organic matter, as well as they are used within the mining industry at the concentration of minerals.

It is previously known (FI pat. appl. 895163) solutions of polyaluminium silicate sulphate (PASS) to be used as flocculation agents at the purification of water, the product being produced by high shearing mixing of aluminium sulphate, sodium silicate, and sodium aluminate. Other fields of use are pulp and paper industry as well as the mining industry.

These PASS solutions are said to be efficient at low temperatures, less corrosive than iron sulphate, aluminium chloride and polyaluminium chloride, to provide a low residual aluminium content in the effluent, to require a low dosage, to provide formation of thick and rapidly settling flocs, to provide improved adsorption, to be effective over a broader pH range, to require a reduced need for alkali, and to be chlorine free, which is a positive matter within the paper industry.

These PASS solutions contains the active compound $Al(OH)_x(SiO_u)_y(SO_4)_z(H_2O)_v + Na_2SO_4$, wherein x is 0.75 to 2.0, y is 0.005 to 0.1, and z is 0.3 to 1.12. The product is prepared by mixing different molar parts of aluminium sulphate, sodium silicate, and sodium aluminate and expose the mixture for a high shearing mixing at 10° to 20° C., and then allow the resulting mixture to ripe at 20° to 90° C. until it becomes a clear solution.

Compared with the production of aluminium sulphate which has the same properties and the same fields of use, even if less efficient, PASS is 1.5 to 1.6 times as expensive as aluminium sulphate.

It is thus desired with reference to the positive effects of PASS but with regard to the high costs to be able to produce a coagulation chemical which is as good as or better than PASS and which can be obtained at lower costs and in a more simple production way. The utility of a high shearing mixing means reduced capacity and high investment.

DESCRIPTION OF THE PRESENT INVENTION

It has now surprisingly turned out possible to obtain this by means of the present invention which is characterized in that a solid zeolite is dissolved in a solution of a trivalent metal salt in a molar ratio $Me^{3+}$:Si of >2:1, preferably 2–500:1.

Further characteristics are evident from the accompanying claims.

By means of the present invention a very simple process is obtained which can be carried out at ambient temperature (20° C.) and which provides a coagulant with improved characteristics over PASS and other known coagulants based on trivalent metal salts.

In the present invention one can use aluminium sulphate, aluminium chloride, polyaluminiumhydroxy chloride, polyaluminiumhydroxy sulphate, polyaluminiumhydroxy sulphatochloride, iron (III) chloride and mixtures of such salts as for example aluminium iron (III) sulphate which is prepared from the raw material bauxite.

The term zeolite means here naturally occurring zeolites as well as synthetically manufactured zeolites. Zeolites are sodium aluminium silicates, of which the so called A-type is preferably used here having the general formulae

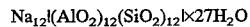

$$Na_{12}[(AlO_2)_{12}(SiO_2)_{12}] \times 27H_2O$$

and containing 14.8% Al, 12.6% Na and 15.3% Si.

The present invention gives a reaction product which is easier to manufacture than the above known, gives low production costs, contains about the same ratios of $Me^{3+}$:Si as the known product, and improves clarification of a treated water.

The present invention will be described more in detail with reference to the following with reference to the examples below which, however, are not intended to restrict the present invention.

Test 1

Sewage water was flocculated using 1) a PASS (OH:Al 1.5:1) according to the manufacturers notice, and 2) a polyaluminiumhydroxy sulphate solution (Al content 6.2%, OH:Al 1.5:1) with a dissolved zeolite (weight ratio 10:1).

The turbidity was determined after flocculation and settling. the flocs were then disintegrated by vigourously stirring whereupon the turbidity was determined once again after a renewed settling.

Method: mixing for 10 s of the coagulant in a flocculator using 6 individual stirrers having a velocity of 400 rpm, 10 min of flocculation at a stirring rate of 50 rpm, 10 min settling, FTU (turbidity) monitoring and P (phosphorous) analysis, 20 s of disintegration, 10 min of settling, and FTU monitoring.

The results obtained are evident from Table 1 below. It is evident therefrom that a considerably lower turbidity is obtained using the present invention and that the flocs obtained are thereby considerably stronger. Furthermore, the phosphate reduction is higher using the reaction product according to the present invention.

TABLE 1

| | Dosage/umol Al/l | | | | |
|---|---|---|---|---|---|
| | 75 | 150 | 300 | 450 | 600 |
| | Turbidity FTU | | | | |
| Acc to invention | 47 | 25 | 9.7 | 6.6 | 3.7 |
| | (54)* | (55) | (33) | (23) | (13) |
| PASS | 48 | 39 | 18 | 12 | 7 |
| | (59) | (59) | (57) | (51) | (35) |
| | P-tot mg/l | | | | |
| Acc to invention | — | 5.5 | 3.3 | 2.4 | 1.2 |
| PASS | — | 6.5 | 4.4 | 3.8 | 2.9 |

*The values within parenthesis denotes the turbidity after disintegration of the flocs.

Untreated sewage water contained P-tot 8 mg/l, FTU >75.

Test 2

Sewage water was flocculated using 1) a polyaluminium-hydroxy chloride solution (PAX) (OH:Al 1.22:1), and 2) a polyaluminiumhydroxy chloride solution according to 1) with a dissolved zeolite 0.35 g (ZEO35), 2 g (ZEO200), and 10 g (ZEO1000) respectively of dissolved zeolite per 100 g of solution of polyaluminiumhydroxy chloride in 1).

The turbidity was determined after flocculation and settling. the flocs were then disintegrated by vigourously stirring whereupon the turbidity was determined once again after a renewed settling.

Method: mixing for 10 s of the coagulant in a flocculator using 6 individual stirrers having a velocity of 400 rpm, 10 min of flocculation at a stirring rate of 50 rpm, 10 min settling, FTU (turbidity) monitoring and P (phosphorous) analysis, 20 s of disintegration, 10 min of settling, and FTU monitoring.

The results obtained are evident from Table 2 below. It is evident theredrom that a considerably lower turbidity is obtained using the present invention and that the flocs obtained are thereby considerably stronger.

TABLE 2

| | Dosage/umol Al/l | | | |
|---|---|---|---|---|
| | 150 | 300 | 450 | 600 |
| | Turbidity FTU | | | |
| ZEO35 | 8.7 | 7.0 | 5.2 | 4.8 |
| | (41) | (38) | (33) | (25) |
| ZEO200 | 8.5 | 5.3 | 4.4 | 3.3 |
| | (40) | (33) | (30) | (21) |
| ZEO1000 | 8.3 | 3.9 | 3.4 | 1.5 |
| | (25) | (21) | (13) | (7) |
| PAX | 10.9 | 7.2 | 5.4 | 3.4 |
| | (37) | (34) | (28) | (21) |

*the values within parenthesis denotes the turbidity after disintegration of the flocs.

Test 3.

In this test the effects on regular river water having a pH of 6.9 and the turbidity of 1.7 to 3.2 FTU were studied, whereby the test was carried out using zeolite containg polyaluminiumhydroxy chloride (OH:Al 1.22:1) (PACZEO35, PACZE200), zeolite containing aluminium chloride (ACZEO35, ACZE200), zeolite containing aluminium sulphate (ASZE035, ASZE1000), zeolite containing alumniumferri sulphate ( AVRZE035, AVRZE1000), and zeolite containing iron (III) sulphate-chloride (Fe:Cl:SO$_4$ 1:1:1) (FeZE035, FeZE100). As a comparison the different solutions of the metal salts without any addition of zeolite (PAC, AC, AS, AVR and Fe). The test was carried out using 150 μmol Me$^{3+}$/l. Redisintegration of the flocs was not carried out. Otherwise in accordance with the method of tests 1 and 2 above. The result obtained is evident from Table 3 below, whereby the result of three repeating tests are given.

TABLE 3

| | Turbidity FTU | g zeolite per 100 g of solution |
|---|---|---|
| PACZE035 | 0.8–1.0–1.4 | 0.35 |
| PACZE200 | 0.7–0.8–1.0 | 2.00 |
| PACZE1000 | 0.5–0.5–0.6 | 10.0 |
| PAC | 0.9–1.0–1.2 | |
| ACZE035 | 1.3–1.4–1.9 | 0.35 |
| ACZE200 | 1.6–1.7–1.8 | 2.0 |
| AC | 1.2–1.3–2.0 | |
| ASZE035 | 1.5–1.6–1.9 | 0.35 |
| ASZE1000 | 1.4–1.6–2.0 | 10.0 |
| AS | 1.6–1.7–2.0 | |
| AVRZE035 | 1.5–1.6–1.8 | 0.35 |
| AVRZE1000 | 1.6–1.7–1.8 | 10.0 |
| AVR | 1.8–1.9–2.0 | |
| FeZE035 | 1.6–1.7–1.8 | 0.35 |
| FeZE100 | 2.0–2.1–2.3 | 1.00 |
| Fe | 1.6–1.7–1.9 | |

The zeolite used is Zeolite Wassalight 90–05 (15% of Al, 13% of Na, 15% of Si, LOI (1100° C.) 20.8%)

EXAMPLES

The following coagulants were prepared in accordance with the present invention in accordance with Table 4. The preparations were prepared by preparing solutions of the different metal salts whereupon zeolite was dissolved therein at 20° C.

| Starting solution | g zeolite per 100 g of solution | Al$^{3+}$ % | Fe$^{3+}$ % | Me$^{3+}$:Si molar ratio |
|---|---|---|---|---|
| AlCl$_3$ | 0.35 | 6.2 | | 125 |
| | 2.00 | 6.1 | | 20 |
| Al(OH)$_{1.22}$Cl$_{1.78}$ | 0.35 | 6.2 | | 125 |
| | 2.00 | 6.1 | | 20 |
| | 10.00 | 5.6 | | 4 |
| Al$_2$(SO$_4$)$_3$ | 0.35 | 4.0 | | 13 |
| | 10.00 | 3.6 | | 400 |
| AVR* | 0.35 | 3.6 | 1.6 | 13 |
| | 10.00 | 3.3 | 1.5 | 400 |
| FeClSO$_4$ | 0.35 | | 12 | 13 |
| | 1.00 | | 12 | 40 |

*AVR is a product prepared from Bauxite, which means that it is a mixed product of Al$_2$(SO$_4$)$_3$ and Fe$_2$(SO$_4$)$_3$.

A maximum concentration of Me$^{3+}$ in a solution with Si will only slightly exceed the ones given in Table 4. However, The aluminium content of a solution prepared of polyaluminium chloride having a lower basicity may be as high as 9.5%. If the silicate content should be considerably higher than that which has been given in the table, the solution will become unstable.

At the coagulation of sewage water the reaction product according to the present invention is suitably used in an amount of at least 100 micromoles of Me$^{3+}$ per litre of sewage water. At the purification of raw water for drinking water purpose at least 75 micromoles of Me$^{3+}$/l shall be used. For dewatering of organic material, sludge dewatering, suitably at least 300 micromoles of $Me^{3+}/l$ are used. For the production of paper pulp the concentration can be at least 100 micromoles of $Me^{3+}/l$.

We claim:

1. A process for the preparation of a coagulant for water purification, in particular purification of sewage water, for pulp and paper manufacturing, for dewatering organic matter, for concentrating minerals, and containing a metal salt and a silicate, comprising dissolving a solid zeolite in a solution of a salt selected from the group consisting of a trivalent aluminum salt and a trivalent iron salt in a molar ratio of $Me^{3+}$:Si of greater than 2:1 to form a reaction product.

2. The process according to claim 1, whereby a solid zeolite is dissolved in a solution of a polyaluminumhydroxy chloride, $Al(OH)_x Cl_y$, wherein the molar ratio of aluminum in the polymetal salt to silicon in the zeolite is 2–500:1, whereby x is a number from 0.5 to 2.5 and y is a number from 2.5 to 0.5, and whereby x+y=3.

3. The process according to claim 1, whereby a solid zeolite is dissolved in a solution of polyaluminumhydroxy sulphate, $Al(OH)_a (SO_4)_b$, wherein the molar ratio of aluminum in the polymetalsalt to silicon in the zeolite is 3–500:1, whereby a is a number from 0.5 to 1.8 and b is a number from 0.6 to 1.25, and whereby a+2b=3.

4. A coagulant for water purification, for flocculation of cellulose fibres, for dewatering of organic material, and for the concentration of minerals, which comprises a reaction product formed when a solid zeolite is dissolved in a solution of a salt selected from the group consisting of a trivalent aluminum salt and a trivalent iron salt in a molar ratio of $Me^{3+}$:Si of 2.5–500:1.

5. A process according to claim 1, whereby a solid zeolite is dissolved in a solution of poly trivalentmetalhydroxy salt in a molar ratio of $Me^{3+}$ in the polymetalsalt to Si in the zeolite of 2–500:1.

* * * * *